US008628826B2

(12) United States Patent
Fürguth

(10) Patent No.: US 8,628,826 B2
(45) Date of Patent: Jan. 14, 2014

(54) METHOD OF PRODUCING AN ORGANIC AND/OR CARBON-CONTAINING FRICTION LINING

(75) Inventor: Werner Fürguth, Biessenhofen/Altdorf (DE)

(73) Assignee: Hoerbiger Antriebstechnik GmbH, Schongau (DE)

( * ) Notice: Subject to any disclaimer, the term of this patent is extended or adjusted under 35 U.S.C. 154(b) by 329 days.

(21) Appl. No.: 13/003,908

(22) PCT Filed: Jun. 24, 2009

(86) PCT No.: PCT/EP2009/004569
§ 371 (c)(1),
(2), (4) Date: Jan. 13, 2011

(87) PCT Pub. No.: WO2010/006686
PCT Pub. Date: Jan. 21, 2010

(65) Prior Publication Data
US 2011/0117280 A1      May 19, 2011

(30) Foreign Application Priority Data

Jul. 17, 2008   (DE) .......................... 10 2008 033 540

(51) Int. Cl.
*F16D 69/02*      (2006.01)
*F16D 69/00*      (2006.01)

(52) U.S. Cl.
USPC ..................... 427/372.2; 427/430.1; 264/344; 264/136; 264/293

(58) Field of Classification Search
None
See application file for complete search history.

(56) References Cited

U.S. PATENT DOCUMENTS

| 2,016,913 A | 10/1935 | Uriwal |
| 5,439,631 A | 8/1995 | Schneider |
| 2005/0179160 A1* | 8/2005 | Moreau .......................... 264/103 |

FOREIGN PATENT DOCUMENTS

| DE | 2717210 A1 | 11/1977 |
| DE | 2918860 A1 | 11/1980 |
| GB | 1390819 A | 4/1975 |
| GB | 2411617 A | 9/2005 |
| NL | 6611885 A | 2/1968 |
| WO | 9423132 A1 | 10/1994 |

OTHER PUBLICATIONS

English Translation of the International Preliminary Report on Patentability mailed Apr. 28, 2011.
International Search Report, dated Apr. 21, 2010.

(Continued)

*Primary Examiner* — David Turocy
(74) *Attorney, Agent, or Firm* — Carlson, Gaskey & Olds, PC

(57) ABSTRACT

A method of producing an organic friction lining includes the steps of producing a liquid friction material pulp placing a fabric into the friction material pulp drying and saturating the friction material pulp together with the fabric placed therein and removing the fabric from the dried friction material.

9 Claims, 1 Drawing Sheet

(56) References Cited

OTHER PUBLICATIONS

How to Select the Best Friction Lining for Synchronizers, Dipl.-Ing., Ottmar Back, Hoerbiger Antriebstechnik GmbH Schongau, Germany, May 2012.
Basics of Synchronizers, Ottmar Back, Jan. 2013.
Forschungsantrag Synchro-Kaltschaltverhalten, Nov. 28, 2003.
FVA-Heft 901_Synchro-Kaltschaltverhalten, retrieved 2013.
Mondeo Gets Added Six Appeal, http://media.ford.com/article_display.cfm?article_id=14459, 2003.
Group 13—Manual Transmission, http://www.digest.net/alfa/FAQ/164/notes_13.htm, retrieved Jul. 2013.
Brochure, Innovative Automotive Transmissions and Hybrid & Electric Drives, 6th Int'l CTI Symposium and Exhibition, May 2012.
Article, Function of synchronizer systems at low temperatures, published by the Technical University of Munich at the 15th International Conference on Experimental Mechanics on Jul. 26, 2012 in Porto/Portugal. Jul. 26, 2012.

* cited by examiner

METHOD OF PRODUCING AN ORGANIC AND/OR CARBON-CONTAINING FRICTION LINING

RELATED APPLICATION

This application is a U.S. national counterpart application of international application serial no. PCT/EP2009/004569 filed 24 Jun. 2009, which claims priority to German Patent Application No. 10 2008 033 540.1 filed 17 Jul. 2008.

BACKGROUND

The present invention relates to a method of producing an organic and/or carbon-containing friction lining.

Organic friction lining materials, which also include carbon-containing materials, have, as a rule, a smooth surface. To influence the frictional behavior, structured surfaces may be produced by embossing, machining, and/or various embodiments of groove geometry.

Studies carried out in connection with the invention have shown the positive influence of structured surfaces on frictional behavior, on wear, and on cold shiftability.

In known manufacturing methods, however, producing a structured surface constitutes an additional manufacturing step which, normally, is time and cost intensive.

There is therefore a need to provide a method of producing an organic friction lining which allows a friction lining having a structured surface to be produced in a technically simple manner.

SUMMARY

A friction lining having a structured friction lining surface is produced without requiring an additional manufacturing step. The friction lining produced by this method exhibits an optimized frictional behavior and an optimized cold shiftability, as well as an increased tear strength.

In one example, a fabric is placed into a liquid friction material pulp. The friction material pulp is dried and saturated together with the fabric and then the fabric is removed from the dried friction material.

It is thus possible to select and adjust the fabric in regard to its structure such that a desired surface structure can be generated. In particular, a thickness of fiber strands of the fabric, a width of mesh and/or a type of weave of the fabric may be made use of as influencing factors for this purpose.

BRIEF DESCRIPTION OF THE DRAWINGS

Further details, advantages and features of the present invention will be apparent from the description below of an exemplary embodiment with reference to the drawings, in which.

DETAILED DESCRIPTION

Figure 1:
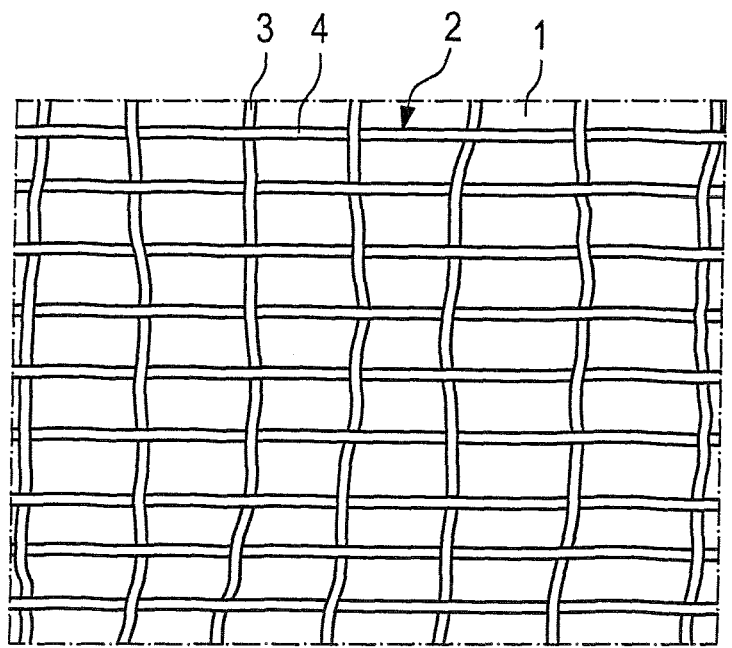
FIG. 1 shows friction material pulp with a fabric placed therein.

In accordance with a first method step, FIG. 1 shows a friction material pulp 1 which has a fabric 2 placed therein. The fabric 2 includes fiber strands, of which two intersecting fiber strands have been denoted by reference numerals 3 and 4 to be representative of all of the strands. The thickness of these fiber strands 3 and 4, the width of mesh, and the type of weave of the fabric 2 may be adjusted to be able to obtain a desired surface structure of the finished friction lining.

Figure 2:
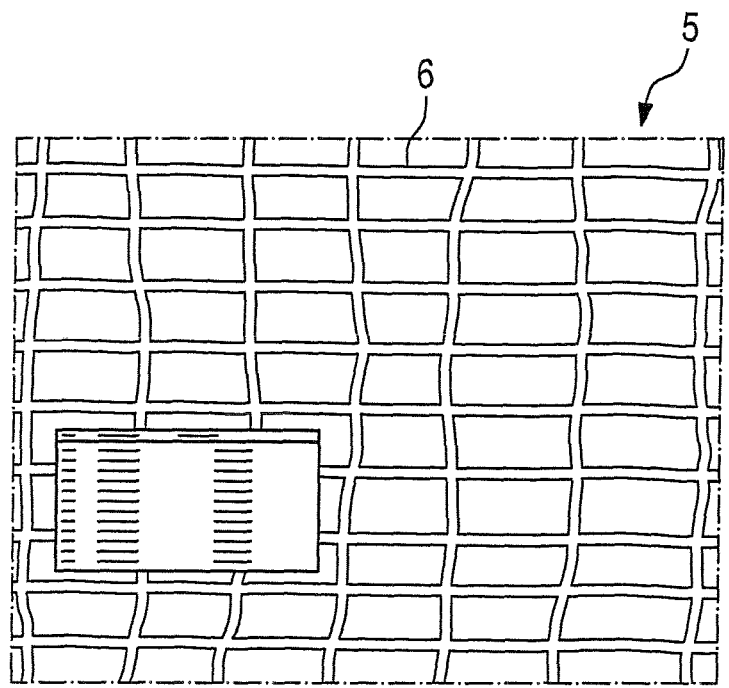
FIG. 2 shows a top view of a friction lining surface of the dried friction lining, which has a structured surface in accordance with the fabric according to FIG. 1.

After drying and saturating the friction lining pulp 1 with the fabric 2 placed therein, the fabric 2 is removed to produce the finished friction lining, which in FIG. 2 is denoted by reference numeral 5. This finished friction lining 5 has a surface structuring 6 of its friction side which corresponds to the type and form of the fabric 2.

In addition to the foregoing written disclosure of the invention, reference is explicitly made hereby to the graphical representation thereof in FIGS. 1 and 2.

The invention claimed is:

1. A method of producing a surface-structure, organic friction lining for transmissions, the friction lining improving cold shiftability, comprising the method steps of:
   (a) producing a liquid friction material pulp;
   (b) placing a fabric into the liquid friction material pulp;
   (c) drying and saturating the liquid friction material pulp together with the fabric placed therein; and
   (d) removing the fabric from the dried friction material.

2. The method according to claim 1, wherein the fabric is adjustable in regard to a thickness of fiber strands, a width of mesh, and/or a type of weave to achieve a desired surface structuring of the dried friction material.

3. The method according to claim 2, including selecting a desired fabric from a plurality of different fabrics to achieve the desired surface structuring.

4. The method according to claim 1, wherein the fabric is removed from the dried friction material to provide a finished friction lining having a friction side that includes a desired surface structure that corresponds to the fabric.

5. The method according to claim 4, wherein the finished friction lining is configured to line a transmission.

6. A method of producing a surface-structure, organic friction lining to line a transmission, the friction lining improving cold shiftability, comprising the method steps of:
   (a) producing a liquid friction material pulp;
   (b) placing a fabric into the liquid friction material pulp;
   (c) drying and saturating the liquid friction material pulp together with the fabric placed therein; and
   (d) removing the fabric from the dried friction material.

7. The method according to claim 6, wherein the fabric is adjustable in regard to a thickness of fiber strands, a width of mesh, and/or a type of weave to achieve a desired surface structuring of the dried friction material.

8. The method according to claim 7, including selecting a desired fabric from a plurality of different fabrics to achieve the desired surface structuring.

9. The method according to claim 6, wherein the fabric is removed from the dried friction material to provide a finished friction lining having a friction side that includes a desired surface structure that corresponds to the fabric.

* * * * *